(12) United States Patent
Cole, III et al.

(10) Patent No.: US 6,420,674 B1
(45) Date of Patent: Jul. 16, 2002

(54) HEAVY-DUTY LASER PLATE CUTTING MACHINE

(75) Inventors: Ira E. Cole, III, Rockford; William B. Scott, Rochelle, both of IL (US)

(73) Assignee: W. A. Whitney Co., Rockford, IL (US)

( * ) Notice: Subject to any disclaimer, the term of this patent is extended or adjusted under 35 U.S.C. 154(b) by 34 days.

(21) Appl. No.: 09/636,205

(22) Filed: Aug. 10, 2000

Related U.S. Application Data

(63) Continuation of application No. 09/396,954, filed on Sep. 15, 1999, now Pat. No. 6,392,192, which is a continuation of application No. 09/302,278, filed on Apr. 30, 1999, now Pat. No. 6,246,025.

(51) Int. Cl.$^7$ .......................... B23K 26/14; B23K 26/16
(52) U.S. Cl. ........................ 219/121.67; 219/121.83; 219/121.63; 219/121.64; 219/121.62
(58) Field of Search ................. 219/121.67, 121.83, 219/121.63, 121.64, 121.62

(56) References Cited

U.S. PATENT DOCUMENTS

| | | | |
|---|---|---|---|
| 4,434,349 A | * 2/1984 | Tsutsumi | 219/121 LG |
| 4,940,880 A | * 7/1990 | Klingel et al. | 219/121.67 |
| 4,950,861 A | * 8/1990 | Erlenmaier et al. | 219/121.67 |
| 5,118,918 A | 6/1992 | Serrano | 219/121.78 |
| 5,136,136 A | 8/1992 | Karube et al. | 219/121.73 |
| 5,227,606 A | * 7/1993 | Weeks et al. | 219/121.67 |
| 5,374,803 A | 12/1994 | Yamada | 219/121.72 |
| 5,399,835 A | 3/1995 | Nakata | 219/121.78 |
| 5,442,436 A | * 8/1995 | Lawson | 356/153 |
| 5,444,211 A | 8/1995 | Nakata et al. | 219/121.67 |
| 5,493,095 A | 2/1996 | Bruschi et al. | 219/121.75 |
| 5,585,015 A | 12/1996 | Hayashi et al. | 219/121.67 |
| 5,607,606 A | 3/1997 | Mori et al. | 219/121.67 |
| 5,637,243 A | 6/1997 | Sato et al. | 219/121.67 |
| 5,667,707 A | * 9/1997 | Klingel et al. | 219/121.67 |
| 5,670,064 A | 9/1997 | Nakata | 219/121.6 |
| 5,756,961 A | 5/1998 | Sato et al. | 219/121.67 |
| 5,777,807 A | 7/1998 | Bar et al. | 359/845 |
| 5,889,256 A | 3/1999 | Osanai | 219/121.74 |

FOREIGN PATENT DOCUMENTS

| | | | | |
|---|---|---|---|---|
| GB | 2327277 A | | 1/1999 | |
| JP | 167990 A | * | 6/1992 | B23K/6/04 |

OTHER PUBLICATIONS

Optimizing Cutting and Welding Processing by Controlling the Laser Beam, D. Christopher Hermanns presented in Lasers in the Workpiece Session at Manufacturing '96 Conference.
Transient Behaviour of Optical Components and their Correction by Adaptive Optical Elements, M. Bea, S. Borik, A. Giesen, U. Zoske.
Bestform Laser Lenses, Special Optics Magazine.
High Power $CO_2$ Laser Beam Collimator, II–VI Incorporated Brochure.
Lasers, Anthony E. Siegman, University Science Books.
Achieving Consistent Results In Laser Cutting Thick Plate, Published In The Fabricator May 1996 Dennis Ebner.
Laser Cutting Heavy Plate Published In Industrial Laser Review, Aug. 19095, Stephen Hicks and Norine Weiss.
Beam Expander–Condensers, II–VI Incorporated.
Trumpf Brochure, Five Axes Laser Processing Center.

* cited by examiner

*Primary Examiner*—M. Alexandra Elve
(74) *Attorney, Agent, or Firm*—Leydig, Voit & Mayer, Ltd.

(57) ABSTRACT

A heavy-duty laser plate cutting machine capable of cutting heavy plate at production rates. The machine includes a laser source having an output power of 4 kilowatts or more. The machine is preferably of the flying optic configuration, and an automatic beam control system, such as an automatically adjustable collimator is interposed between the laser source and a focusing optic carried in the cutting head. The cutting head, in addition to normal Z-axis control, has an adjustment to position the focal spot relative to the workpiece. The focal spot can be driven into the workpiece when cutting heavy plate. A machine bed underlying the workpiece is capable of absorbing significant energy from the remnant laser beam without damaging the machine base.

24 Claims, 9 Drawing Sheets

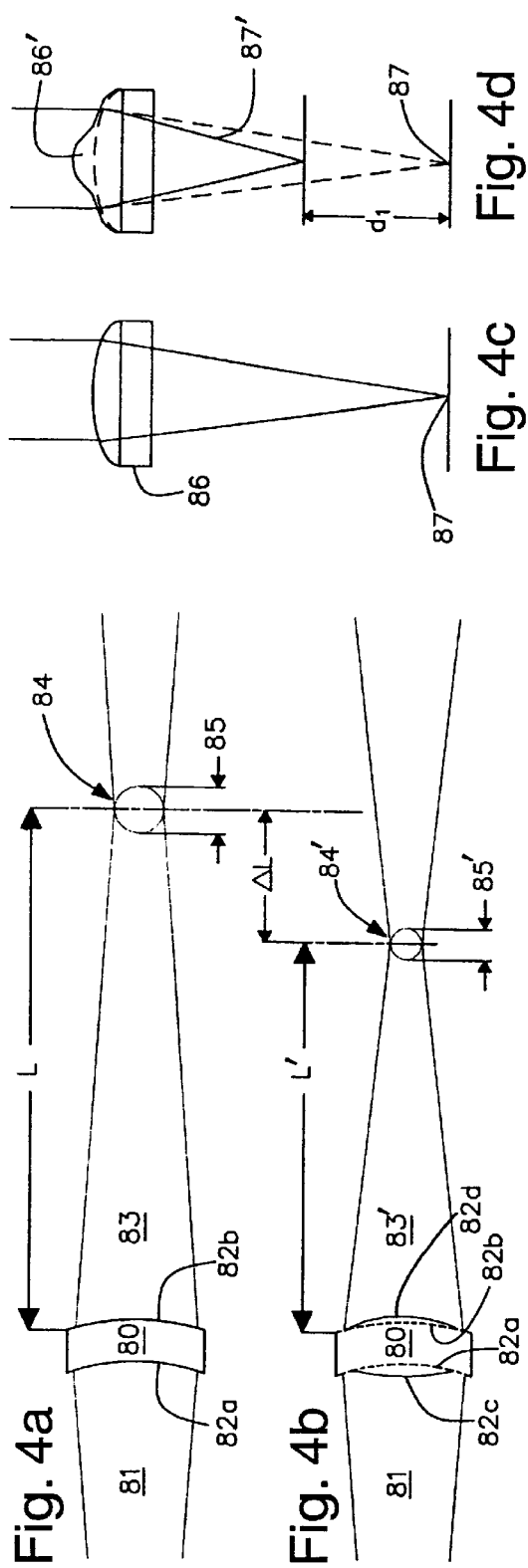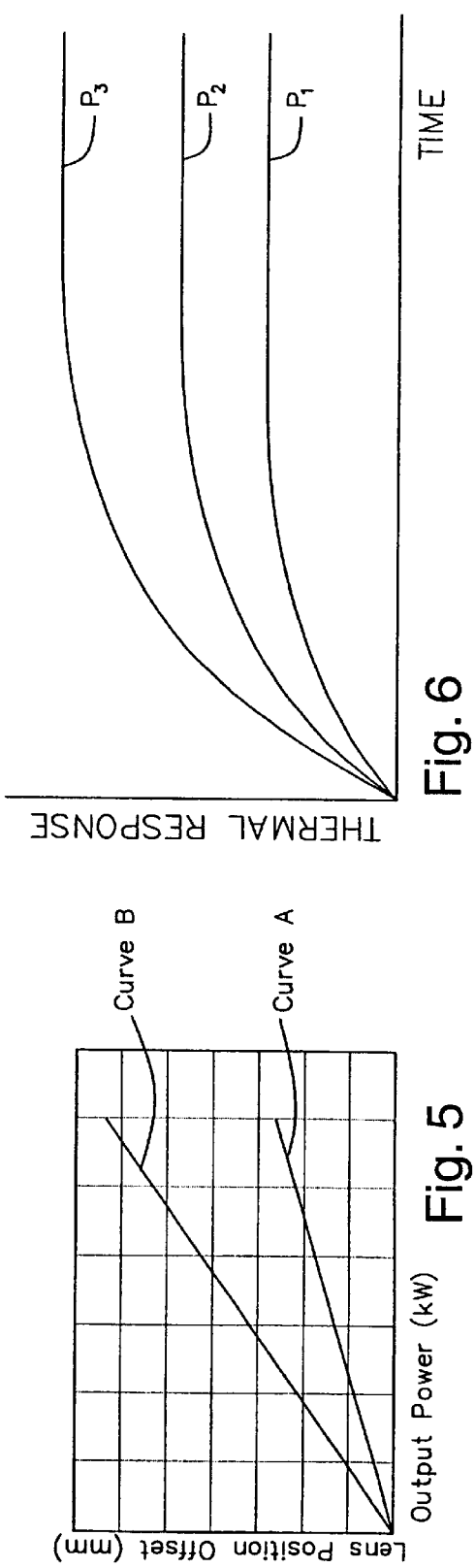

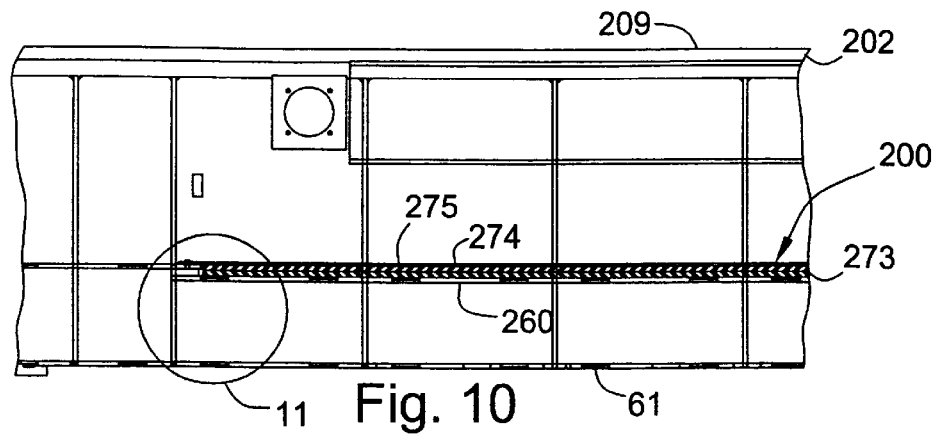
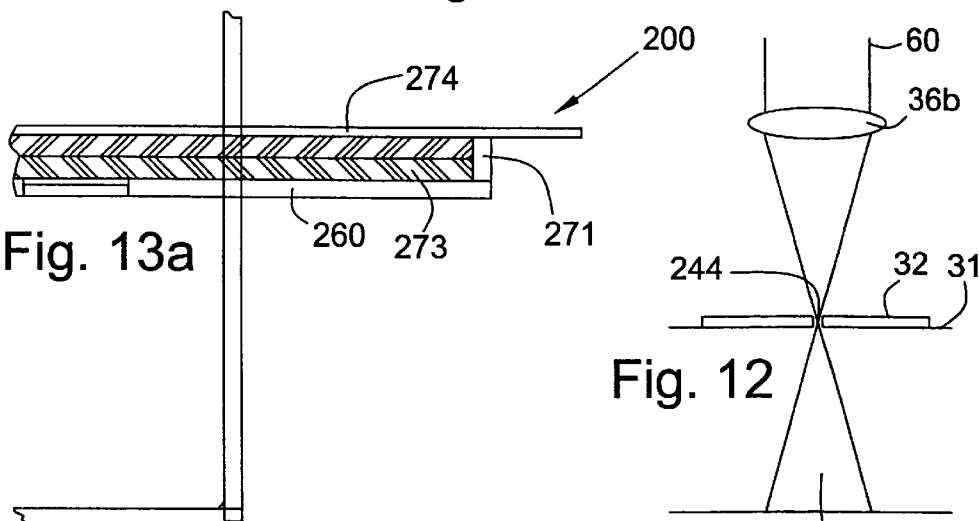
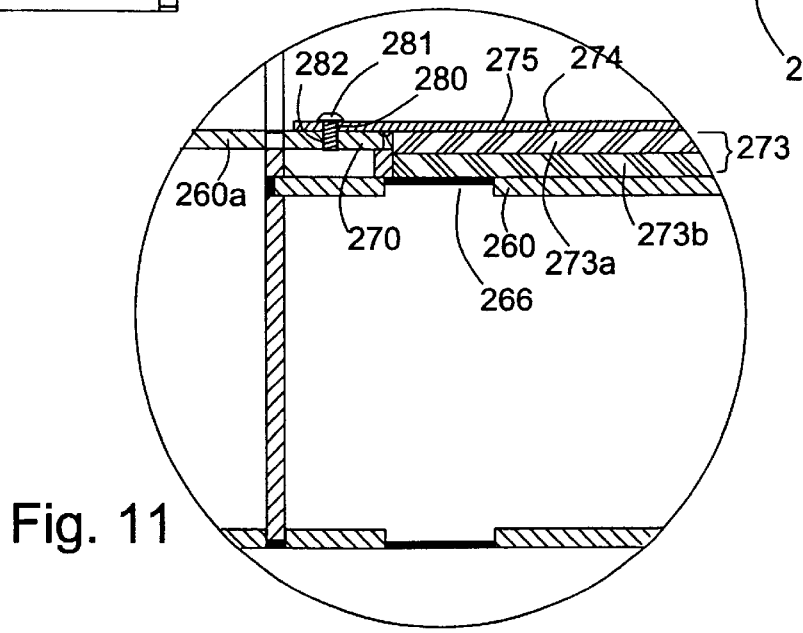

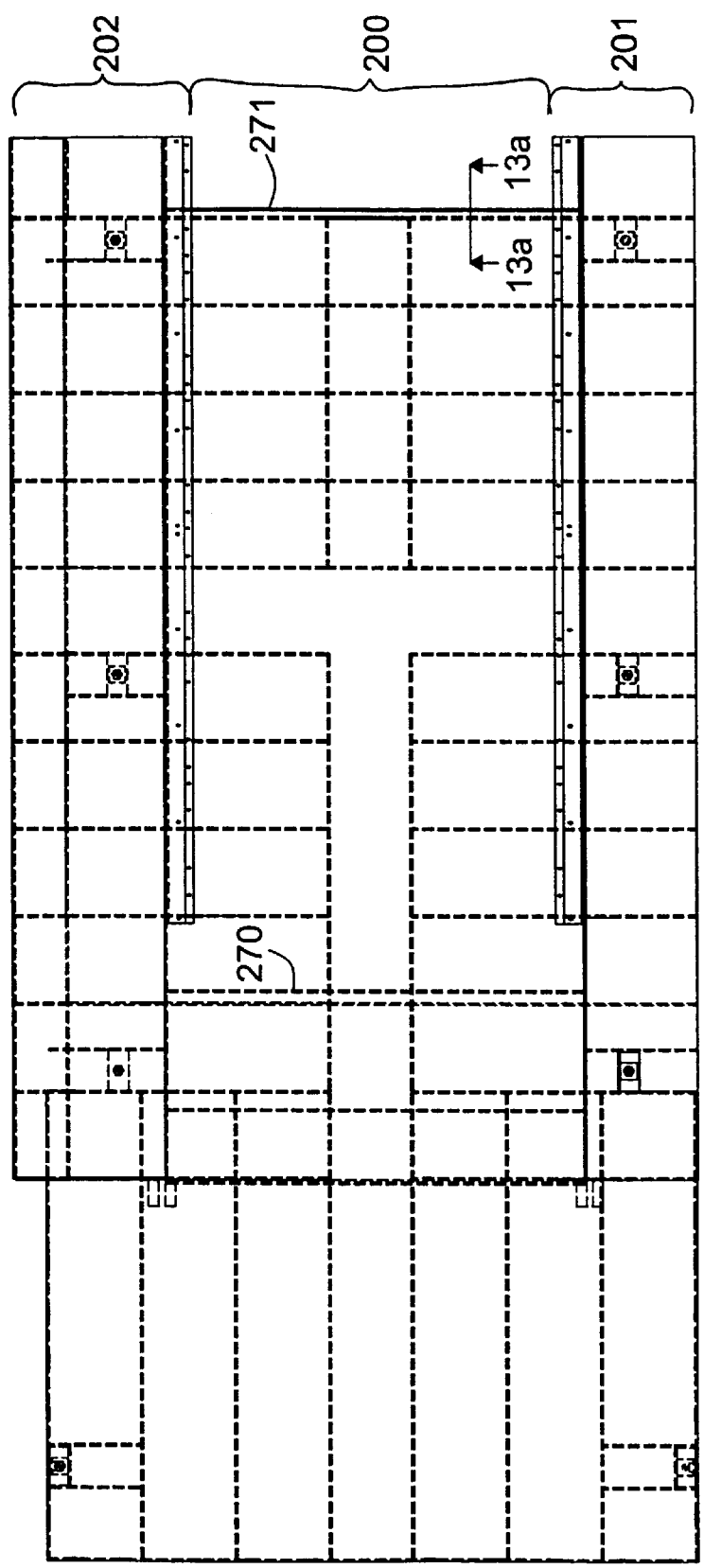

HEAVY-DUTY LASER PLATE CUTTING MACHINE

RELATED APPLICATIONS

This application is a continuation of U.S. applications Ser. No. 09/302,278, filed Apr. 30, 1999 now U.S. Pat. No. 6,246,025 and Ser. No. 09/396,954, filed Sep. 15, 1999 now U.S. Pat. No. 6,392,192, the teachings and disclosure of which are hereby incorporated in their entirety by reference thereto.

FIELD OF THE INVENTION

The present invention relates to laser-equipped machine tools, and more particularly to a heavy-duty laser plate cutting machine.

BACKGROUND AND SUMMARY OF THE INVENTION

In the following paragraphs, background information, and information summarizing the invention will be presented together so as to convey a coherent view of the significance of the invention.

Laser-equipped machine tools are often used to cut parts from sheet metal and plate. In such machine tools a laser beam, concentrated by a focusing lens or mirror to a small diameter spot, or focus. The laser beam is directed to position the focal point above, at or below the surface of the material to be cut. The laser beam is directed by the focusing optic through a nozzle disposed immediately above the workpiece, with a pressurized gas being directed through the nozzle, typically coaxially with the laser beam, to assist the cutting process. The pressurized gas interacts with the laser beam and material, facilitating the cutting process, and creates a high velocity stream that carries the melted material away from the cut.

Laser-equipped machine tools are usually Computer Numerically Controlled, and are manufactured in many configurations and sizes and with lasers of various types and power. The present invention relates to heavy-duty plate lasers, such as those which are capable of cutting steel plate on the order of one-inch thick or more at production cutting rates on the order of 24 inches per minute. The present invention is directed to a machine having those capabilities and, in some instances, sufficient adaptability to also efficiently handle lighter materials, such as sheet metal. In the most preferred embodiment, a "flying optic" configuration is utilized. In that configuration the cutting head is adapted for movement along one axis, such as the Y-axis which is mounted on a bridge adapted for movement along an orthogonal, X-axis. The work is supported on a stationary pallet or table below the bridge. Movement of the cutting head is coordinated with movement of the bridge to define a precise path on the part. The cutting head and laser are controlled to pierce and cut thereby forming holes and shapes in the material, and then to cut the part from the material.

In configuring a versatile machine tool capable of cutting heavy plate, it is highly advantageous to provide for the use of focusing optics with different focal lengths. An optic with one focal length can be used for cutting thick plate, and another with a different focal length can be used for cutting thinner materials. The ability to change focal lengths is an important feature in a heavy-duty plate machine adapted to also cut lighter materials.

The focal length of the optic contributes to the diameter of the focal spot and thus the energy density, Watts per unit area, at the focal spot. Shorter focal length optics create smaller focal spots having higher energy densities. The focal length of the optic also contributes to depth of focus of the focal spot with longer focal lengths having greater depth of focus. Shorter focal length optics are advantageous for cutting thinner materials while longer focal length optics are advantageous for cutting thicker material. The focal length of the optic and the power level of the laser contribute to the energy density remaining in the laser beam at distances beyond the workpiece during various stages of the cutting process.

Adapting high power lasers to cut thicker materials leads to using focusing lenses with longer focal lengths. Below the focal point, a laser beam expands at approximately the same rate that it was focused. For example, if a 35 mm diameter laser beam is focused by a lens with a 10" focal length, then, 10" below the focal point, unless absorbed by the material cut, the beam would be approximately 35 mm in diameter again. Twenty inches below the focal point the beam would be roughly 70 mm in diameter. This remnant diverging beam from high power lasers has considerable capability to cause damage. For example in certain tests, a 0.125" thick aluminum plate was scuffed with steel slag, then a 38 mm diameter 5500 Watt beam was directed at the surface. The aluminum was cut through in 40 seconds. Similar tests were made with 0.25" inch thick stainless steel and carbon steel. Both were cut through in well under a minute. These tests indicated that a scrap collection bed underlying the cutting area of a high power laser system, with long focal length optics in use, would be at considerable risk of being damaged by the remnant laser beam.

In a laser cutting machine, the laser beam is produced in a laser generator and is directed along a beam path via a beam delivery system. A beam delivery system is a collection of optical elements, such as reflective mirrors and transmissive optics, which may redirect the beam, alter the propagation characteristics of the beam or focus the beam. The beam delivery system is enclosed for safety and for control of the beam path environment within. The laser beam is concentrated by a focusing lens or mirror to a small diameter spot, which is directed to an appropriate position relative to the surface of the material to be processed.

In most implementations, the laser beam exits the laser through an output coupler, a partially transmissive and partially reflective optical element which seals the laser cavity and transmits a portion of the beam out of the laser cavity or resonator. The beam is then directed along a beam path to a focusing optic in a processing head near the work. In most cutting applications, the beam is directed by the focusing optic through a nozzle disposed immediately above the workpiece to be cut. A pressurized gas is also directed through the nozzle, typically coaxial to the beam, to assist the cutting process. The pressurized gas serves to facilitate and/or shield the cutting process, and creates a gas stream which helps remove vaporized and molten material from the cut or kerf. Kerf refers to the zone of material which is acted upon and removed by a cutting process. Kerf width refers to the width of the slot created by the cutting process, such as the width of the slot cut by a laser beam as it moves along a path.

Key factors in laser processing include the diameter of the focus spot and the position of the focus spot relative to the material to be processed. The control of these focal characteristics is critical to maintaining the quality of the process. During processing, unintended deviation in the focus spot size and position may produce a deterioration in process quality and may even cause the process to fail.

The first of two main factors which influence the focus characteristics is the diameter of the laser beam at the focal optic. Due to diffraction, the minimum focal spot diameter, for a given focal length optic, is limited. Diffraction causes light beams to diverge or spread transversely as they propagate. As the input laser beam diameter, of a typically diverging beam, increases at a given focal optic, the focus spot diameter decreases due to a decrease in diffraction. In addition, as said input laser beam diameter increases for a given focal optic, the focus spot position shifts closer to the focus optic.

The raw laser beam, issuing from the laser resonator, exhibits the characteristic of divergence. The beam diameter will change as a function of the distance from the output coupler. Typically, as the processing head moves over the processing area the distance from the output coupler to the focal optic will change. When a large processing area is required, some method of maintaining the proper beam diameter must be employed in order to avoid significant changes in focus diameter and position.

Additionally, changes in the output power level of the laser will affect the divergence of the output beam. The largest effect on beam divergence comes from the thermal loading of the output coupler which produces thermal lensing. Thermal lensing is distortion of an optical component caused by heat absorbed from the input beam. The absorbed portion of the beam causes expansion of the output coupler such that the curvature of the surface changes. The expansion causes a change in the divergence of the output beam thereby changing the beam size at any given distance from the output coupler. The rate and amount of distortion is dependent upon the power of the beam, optic contamination, thermal conductivity of the optic and its cooling system and the length of time the beam is applied. Upon reaching thermal equilibrium, when absorbed heat is in balance with that removed by the lens cooling system, the shape of the optic surface remains constant. When the beam is turned off, the optic surface gradually relaxes and returns to its original shape. When a high output power laser is required, some method of maintaining the proper beam diameter, in a time dependent response to output power changes, must be employed if significant changes in focus diameter and position are to be avoided.

The second of two main factors which influence the focus characteristics is the distortion of the focus optic due to heat absorption. In a manner similar to that described for the laser output coupler, thermal lensing occurs in the focus optic. The expansion of the focus optic changes the effective radius of curvature which causes the focal spot to shift relative to the focus optic. When a high output power laser is required, some method of maintaining the proper focal position, in a time dependent response to input laser power changes, must be employed if significant changes in focus position are to be avoided.

Proper focal position is very important in cutting heavy plate. In initiation of a cut, the plate must be pierced, and a preferable piercing technique requires "driving" the beam through the plate. This can be accomplished by altering the position of the focal spot, by actually moving it into the plate as the piercing operation progresses. Furthermore, in cutting different types of materials, it is often useful to alter the focal spot position with respect to the surface of relatively thick materials so as to optimize the quality of the cut.

Turning now to the divergence issue mentioned above, one method employed to reduce the divergence of the laser beam is to expand or magnify it with a collimator. The rate of divergence of a beam is reduced in inverse proportion to the amount it is magnified. If a beam is magnified by 125 percent its rate of divergence is reduced 20 percent. If it is magnified by 200 percent its rate of divergence is reduced by 50 percent.

Collimators are optical devices, also known as beam expanders and condensers. Such devices also have other characteristics and functions known to those skilled in the art. Manufacturers of laser optics publish literature providing information on design variations and examples of use. One example of such literature is the II–IV Incorporated publication, Beam Expander-Condensers, published 3/92. Collimators can be constructed of transmissive optics such that the beam is passed through the optics. Such collimators are commonly used in laser-equipped machines up to about three kilowatt power levels and sometimes above.

Collimators used on low powered lasers are designed or adjusted to magnify the beam a given amount, and then locked in place. Use of transmissive collimators with lasers having power levels above three kilowatts becomes increasingly problematic due to thermal lensing and due to limits on the energy density that transmissive optic materials can withstand. Impurities within optical materials, crystal growth conditions, surface contamination and surface imperfections are primary causes for a portion of a laser beam to be absorbed and converted to heat within a transmissive optical element.

The distortion produced by thermal lensing can influence the divergence and mode quality of the beam passing through or reflecting off of the optical delivery and focusing components and thereby cause detrimental shifts of focus position. Thermal lensing is a greater problem with transmissive optics. For example, when a high power beam is directed at the curved surface of a plano-convex focal lens, which has a curved first surface and a flat second surface, the absorbed portion of the beam causes expansion of the lens such that the curvature of the surface changes. The expansion reduces the effective radius of curvature which causes the focal spot to shift back from the material or closer to the lens. The rate of curvature change is greater toward the center of the lens due to the power distribution of the incident laser beam. Therefore, the heating and the expansion is greater toward the center of the lens. Fixed collimators constructed of transmissive optics are very susceptible to thermal lensing which reduces their effectiveness for use with high power lasers.

Collimators are also constructed of reflective optics, combinations of flat and shaped mirrors, such that the light beam is reflected from the optical elements. Reflective optical elements are typically manufactured from materials, such as copper, which can withstand greater energy densities without damage. Also, when compared to transmissive optics, thermal lensing of reflective optics is not as severe. Thus reflective collimators are more suitably used in high power laser applications. However, a fixed, reflective collimator cannot compensate for the thermal lensing of a laser output coupler nor for the thermal lensing of a focal optic.

In view of the foregoing, it is a general aim of the present invention to provide a high power laser-equipped machine tool having the capability to cut relatively thick plate at production rates.

It is a more detailed object to provide a high power laser-equipped cutting machine of the foregoing type which is sufficiently versatile to be able to also cut sheet metal at production rates.

An objective of the present invention is to provide a laser-equipped cutting machine having a combination of features and functions adapted to cutting a relatively thick plate at production rates, with sufficient versatility to function on thinner materials at commercially acceptable cutting rates.

It is a feature of the preferred embodiment of the invention that the machine tool utilizes a high power laser and a flying optic beam delivery system for delivering a high power beam to a workpiece while still providing relatively fast feed rates. The beam delivery system includes automatic beam compensation to maintain precise control of the focus spot size and focus position of the laser beam while accommodating changes and variations in the optical system due to the energy in the beam and distance between the laser generator and the cutting head. The focusing lens carrier system in the cutting head provides means for ready adjustment of the position of the focal spot relative to the work to handle focal spot position adjustments needed for cutting thick plate. Positioned below the workpiece is a slag collection bed, configured so as to be able to occasionally absorb the power of the laser beam without permanent damage.

Other objects and advantages of the invention will become more apparent from the following detailed description when taken in conjunction with the accompanying drawings.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIGS. 4a–4d are diagrams illustrating the phenomenon of thermal lensing;

FIG. 5 is a diagram illustrating focal position offset as a function of steady state output power for two typical focusing lenses;

FIG. 6 is a diagram illustrating the rate at which a lens will absorb energy from an incident laser beam at different power levels, and thus change in size and transmissive characteristics;

FIG. 10 is a sectional view taken along the line 10—10 of FIG. 2, and better illustrating the insulated bed structure;

FIG. 11 is an enlarged sectional view of area 11 shown in FIG. 10;

FIG. 12 is a schematic representation of a laser beam passing through a focusing optic; converging to a focal spot, and diverging beyond the focal spot;

FIG. 13 is a plan view showing the machine base of the machine tool of FIG. 1;

FIG. 13a is an enlarged sectional view taken along the line 13a—13a of FIG. 13.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

Figure 1:
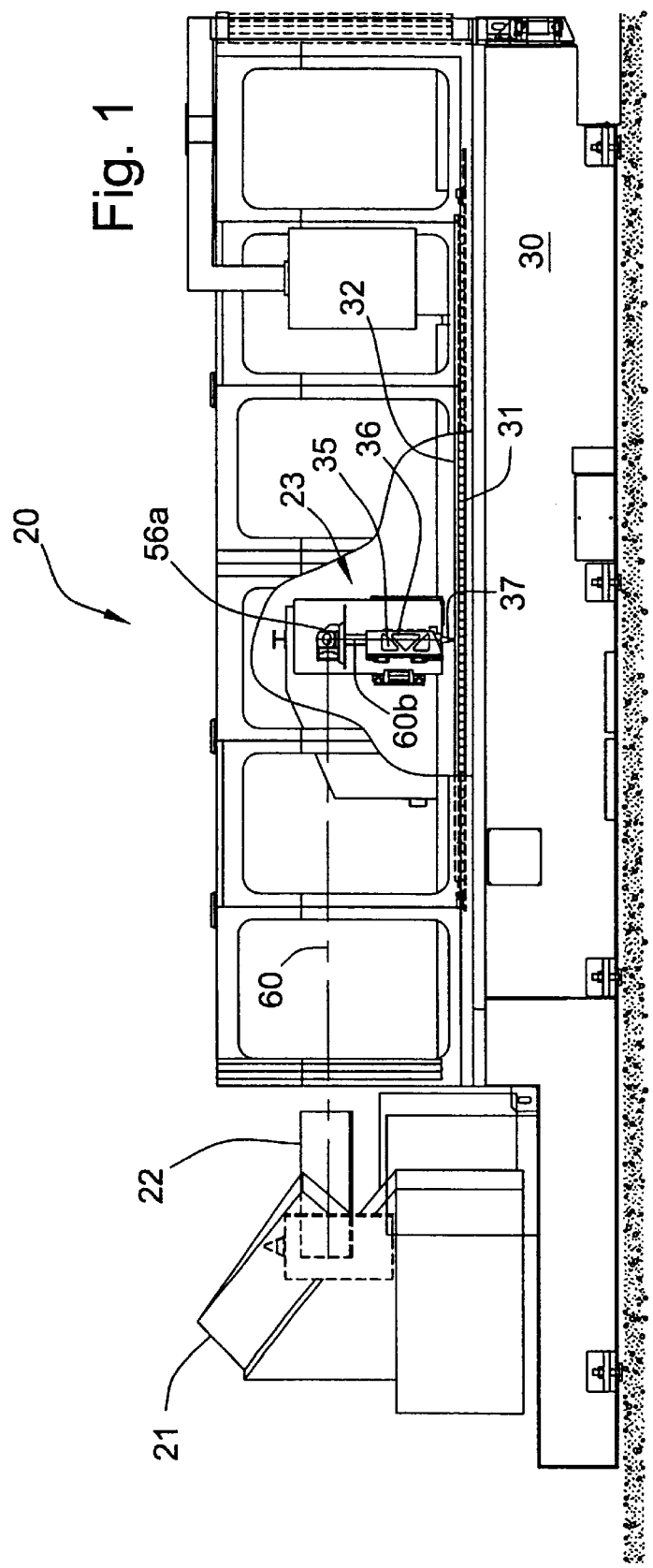
FIG. 1 is a front elevation, partly simplified and partly broken away, showing a laser-equipped machine tool in which the present invention can be embodied.
Figure 2:
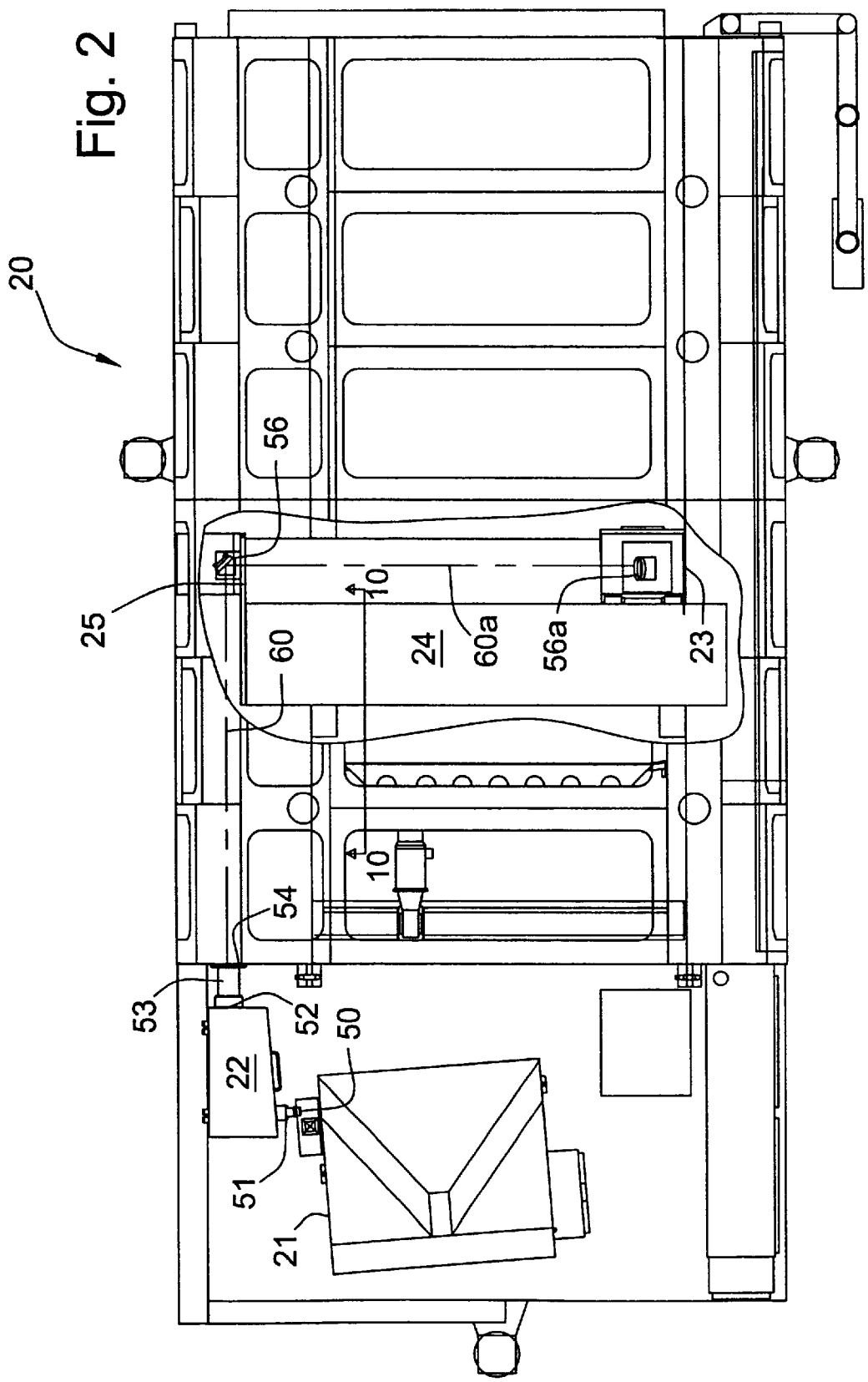
FIG. 2 is a plan view of the machine of FIG. 1.

Turning now to the drawings, FIGS. 1 and 2 illustrate a laser-equipped cutting machine capable of cutting heavy plate in accordance with the invention. In the illustrated embodiment, a laser cutting machine tool 20 includes a collimator 22 interposed between a laser source 21 and a cutting head indicated generally at 23. Briefly, laser cutting machine 20 consists of a base 30 which supports a worktable 31 on which rests a workpiece 32. The laser source 21 will not be described in any detail except to note that in this case it is a high power device producing a beam having power of 3 kilowatts or more, preferably 4 kilowatts and most preferably in the order of 6 kilowatts or more.

Cutting head 23 includes an optical housing 35 which carries a focusing optic (not shown). The focusing optic is mounted in a holder 36 which is mounted in a slot 36a in the optical housing or carrier 35 (see FIG. 3 for slots 36a in which the optic holder is carried). The carrier 35 provides a plurality of slots 36a (4 slots being shown in FIG. 3). Each slot is intended to hold an optical element of a different focal length. For example, one of the slots is dedicated to 10 inch focal length lenses. When the machine is desired to operate with that focal length optic, a lens holder, carrying a 10 inch focal lens, is inserted in the optical housing 35 in the slot 36a for 10 inch focal length optics. All of the other slots 36a will be filled with blank holders, which contain no lens, and simply serve to seal the beam path through the cutting head. When it is desired to change to a longer or shorter lens, the 10 inch focal length optic holder is removed and replaced with a blank holder, whereas a new lens holder, say for 12.5 inch focal length is put into the slot physically associated with that focal length.

The ability to change optics as described above is important in a versatile machine. It will be most efficient to use relatively long focal lengths (say 10 inch or more) for thick plate, because of the increased depth of focus and larger spot size they provide. However, with thinner materials, it is preferable to use shorter focal length lenses. The ability to install different focal length lenses in the cutting head without making other adjustments provides means to quickly change from longer focal length lenses for cutting heavy plate to shorter focal length lenses for lighter or thinner material.

Returning to an overview of the cutting elements, laser source 21 delivers a high power laser beam to collimator 22 which directs a collimated beam 60 to first bending mirror 56, then to second bending mirror 56a mounted above cutting head 23, and then to a focusing optic mounted in a lens holder 36. The laser beam is directed from focusing optic through nozzle 37 disposed immediately above the workpiece. Pressurized gas is also directed through nozzle 37, coaxially to the laser beam, to assist the cutting process. The pressurized gas serves to facilitate and/or shield the cutting process, and creates a gas stream which helps remove vaporized and molten material from the cut.

Cutting head 23 is adapted for movement along one axis, here called the Y-axis which is mounted to bridge 24. Bridge 24 is adapted for movement along an orthogonal X-axis. The workpiece or plate 32 is supported on a pallet or table 31 below bridge 24. Movement of cutting head 23 is coordinated with movement of bridge 24 to define a precise path on plate 32. Laser 21 and cutting head 23 are controlled to pierce and cut holes and shapes and then the boundary of a part from the plate 32.

Figure 3:
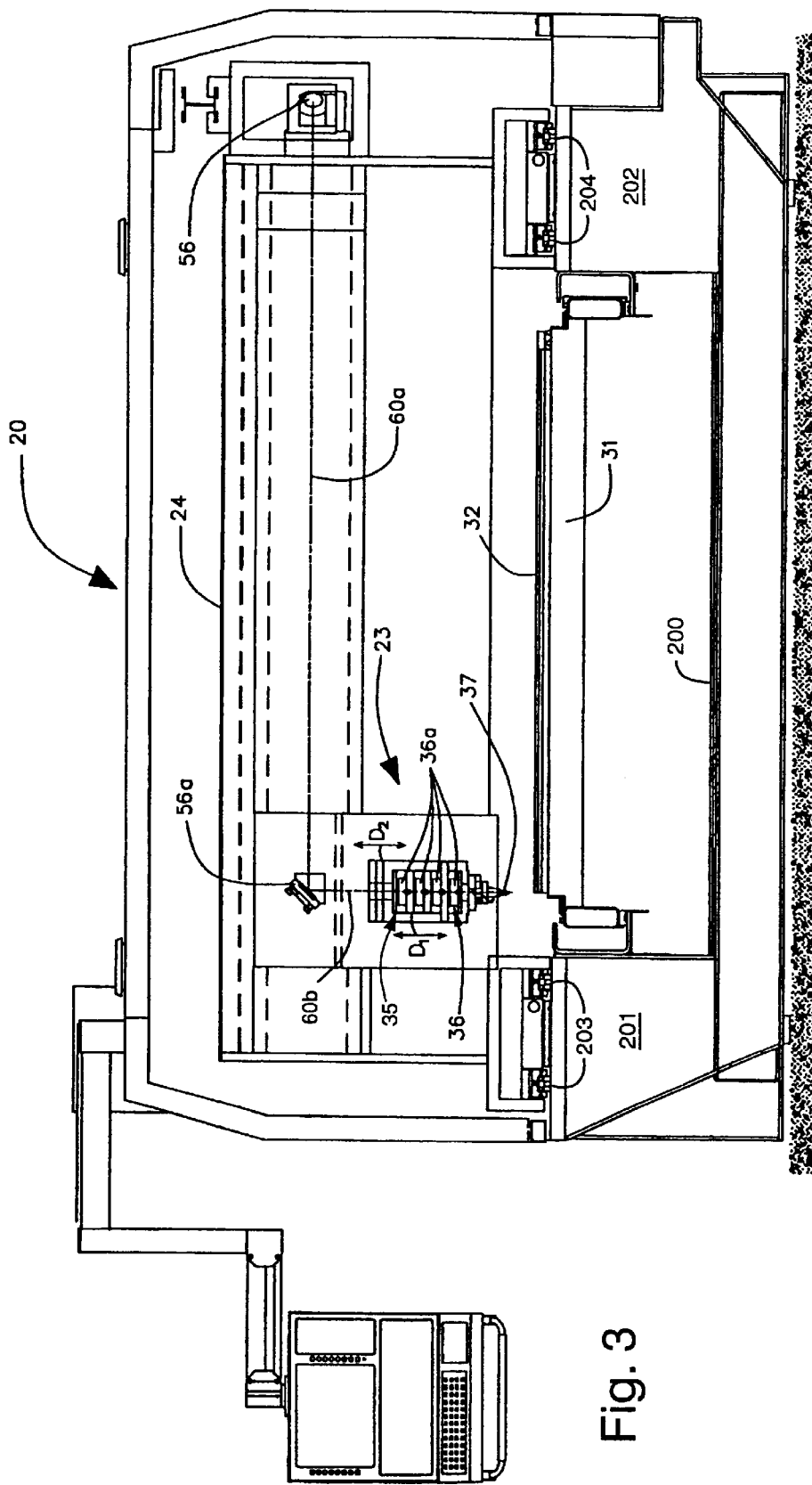
FIG. 3 is an end elevation of the machine of FIG. 1.

Cutting head 23 traverses the full length of the worktable 31 (left to right as shown in FIG. 2) and the full width of the worktable 31 (top to bottom as shown in FIG. 2 or left to right as shown in FIG. 3). Those boundaries define the cutting area and the maximum size workpiece 32 that the machine can process. With this machine configuration the length of the laser beam path between the laser output coupler and the focusing optic in cutting head 23 changes as the cutting head 23 moves over the cutting area.

As best shown in FIG. 2, beam 60 is directed from collimator 22 to bending mirror 56 which is attached to the end of bridge 24 by way of panel 25. Mirror 56 moves with bridge 24 such that the distance between collimator 22 and mirror 56 is variable and dependent on the position of bridge 24 within its length of travel.

As best shown in FIGS. 2 and 3, beam 60a is beam 60 reflected from mirror 56 to mirror 56a mounted above cutting head 23. Mirror 56a moves with cutting head 23 such that the distance between mirror 56 and mirror 56a and thus the length of beam path 60a is variable and dependent on the position of cutting head 23 within its length of travel.

As best shown in FIG. 3, beam 60b is beam 60a reflected from mirror 56a through a lens (not shown) carried in lens holder 36 and then through nozzle 37 to the workpiece 32. Cutting head 23 is shown in a retracted position above the work. Nozzle 37 would typically be positioned within a few mm above the surface of the work 32 when cutting. The length of beam 60b is variable and dependent upon the thickness of material 32 processed, the position of the focal optic within its length of travel and the vertical position of cutting head 23 within its length of travel.

In summary, the length of the beam path between the laser output coupler and the workpiece is variable in a flying optic cutting machine. The range of variation of the path length is dependent upon the length of travel along the X, Y, and Z axes. In practical terms, the amount of variation in this Z-axis is insignificant and can be ignored. However in some configurations the amount of variation in the Z-axis is significant and must be compensated. In the configuration shown, the beam path is shortest when cutting head 23 is positioned to the extreme left end of the work support 31, see FIG. 1, and to the extreme right side of the work support 31, see FIG. 3, and when cutting thick material. It is longest when cutting head 23 is positioned to the extreme right end of the work support 31, see FIG. 1, and to the extreme left side of the work support 31, see FIG. 3, and when cutting thin material. In the exemplary machine, the difference in beam path length between those two extremes is a little over 6 meters.

Collimator 22, part of an automatic beam control system, provides means to vary the divergence of laser beam 60 at the collimator output, and thus to control the size of the beam at the focusing optic in the cutting head. Broadly, the automatic beam control system and the collimator can be considered to assist the focusing optic in the cutting head to focus the beam. Preferably, it does so by maintaining a controlled and consistent spot size projected onto the focusing optic. However, it can also be controlled to vary the spot size to produce desired effects on the beam projected onto the workpiece. The collimator is preferably motorized by means of a servo motor or other precision prime mover, and positioned under CNC control to correct and compensate for changing beam characteristics.

Path length changes of the order noted can have a marked impact on the size of the beam incident on the focusing optic and correspondingly on the shape and position of the focused beam aimed at the workpiece. Observable changes will be noted in the quality of the cut and size of the part as the cutting head is traversed across its range of travel.

In accordance with one aspect of the present invention, a control system operates collimator 22 to control beam divergence in such a way as to maintain a desired beam size at the focusing optic. In the simplest case, the beam size at the focusing optic is controlled to maintain a constant size. However, there are cases where the system can introduce controlled variations in beam size to compensate for other system variables. Unless the context indicates otherwise, the term "controlled beam size" is intended to encompass both alternatives. In its most preferred form the present invention is utilized with a reflective collimator so as to be able to operate in what is considered a high power range, generally three to four kilowatts and above. Transmissive collimators or other transmissive beam correction devices are preferably avoided in high power applications because of the additional thermal lensing and beam distortion problems they introduce when operated at high power levels. A preferred form of collimator 22 is described and claimed in a commonly owned application in the name of Ira E. Cole III, Ser. No. 09/353,936, filed Jul. 15, 1999, the disclosure of which is hereby incorporated by reference. Other continuously adjustable collimators can also be used in the practice of the present invention. U.S. Pat. No. 5,442,436 shows an adjustable collimator having four reflective optical elements. Such a collimator, with the addition of a servo motor adapted to drive its adjustment mechanism, could also be used in the practice of the present invention.

A controllable drive system, such as a servo motor and drive, is required to operate a continuously adjustable collimator and thereby correct for beam divergence changes. Other forms of controllable drive systems such as stepper motors, servo controlled linear motors, or servo controlled fluid driven cylinders could be used. Such systems are characterized by the ability to precisely position a driven device such as a collimator. Such servo systems usually include some form of position feedback. Adaptive optics, which alter the curvature of a mirror, may be employed to the same purpose as the collimator.

In addition to path length caused changes of beam characteristics, thermal lensing causes another change. Thermal lensing is the distortion of an optical component caused by heat absorbed from the input beam. Absorbed heat distorts the optic causing a change in focus characteristics. The rate and amount of distortion is dependent upon the power of the beam, thermal conductivity of the optic and its cooling system and the length of time the beam is on or off. Upon reaching thermal equilibrium, when the absorbed heat is in balance with that removed by the lens cooling system, the shape of the optic surface remains constant. When the beam is turned off, the optic relaxes and returns to its original shape.

Thermal lensing is more pronounced in transmissive optics such as a laser output coupler or a focal lens. FIGS. 4a–4d illustrate thermal lensing. FIG. 4a illustrates a laser output coupler 80 which partially reflects and partially transmits beam 81. As is typical, the inner surface 82a and outer surface 82b are contoured such that transmitted beam 83 has a narrower waist 84 positioned "L" distance from the output coupler and having a diameter 85. FIG. 4b illustrates the effects of thermal lensing. The output coupler expands as heat is absorbed. The original optical surfaces 82a and 82b, shown in dotted lines, are distorted, as shown in solid lines and in an exaggerated fashion as 82c and 82d, thus causing a change in characteristics of output beam 83'. The beam waist 84' is made smaller and shifts ΔL in position.

The change in beam propagation characteristics of an optic operating at various power levels can be determined by test and is substantially repeatable. From test data, it is possible to derive an equation to predict the magnitude of the beam waist shift and divergence change as a function of integrated time and power. As will be described in greater detail below, the present invention provides the ability to combine such information with beam path length information to position a collimator to compensate for and thus correct changes in beam characteristics such that intended characteristics are maintained.

Focal optics are also subject to thermal lensing. FIG. 4c shows a plano-convex focal lens 86 having focal spot 87. FIG. 4d shows optic 86' distorted in exaggerated fashion to illustrate thermal lensing and shows a shifted focal spot 87'. Distance $d_1$ between focal spots 87 and 87' represents the shift in focus caused by thermal lensing in exaggerated fashion. In high power devices this shift can be substantial. For example a piano-convex zinc selenide 10 inch focal length lens subjected to a 6 kilowatt beam 35 mm in diameter was determined to have a focus shift exceeding 6 mm. In the present invention, thermal lensing of the focal optic is compensated separately from thermal lensing of the output coupler and is accomplished by adding a correction signal to the drive system which positions the focal optic.

FIG. 3 shows the cutting head 23 with nozzle 37 positioned over the workpiece 32. The Z-axis driving mechanism is schematically illustrated and identified as $D_2$. That drive moves the cutting head in the vertical, Z-axis direction, and positions the nozzle at a predetermined distance above workpiece 32 for cutting. A second drive, identified schematically as $D_1$, translates the lens carrier 35 within cutting head 23. The lens carrier drive, as it is sometimes referred to herein, adjusts the position of the focal spot relative to the surface of workpiece 32 without changing the position of the nozzle with respect to the same surface. It is used to position the focus spot correctly for piercing and cutting various materials. In some cases the lens is driven downwardly during part of the piercing cycle. In all cases the position of the focal spot has a predetermined desired position. However, thermal lensing will cause an undesirable shift in focal spot position. In practicing certain aspects of the invention, drive $D_1$ is provided with a Z-axis position command and a Δz position offset which corrects for a shift in position of the focus spot caused by thermal lensing.

FIG. 5 illustrates, for two different optics, the amount of focal point shift as a function of power incident on the optic. Curve A represents the focal spot shift produced by various power levels from zero through six kilowatts. Curve B represents the same information for a different focal length optic. The invention compensates for such shifts by introducing corrective action.

Compensating for thermal lensing is not a simple steady state problem as suggested in FIG. 5. A lens can be considered a thermal integrator, which stores and releases heat with the rate of change dependent upon the power of the beam, the effectiveness of the cooling system, and duration which the beam is applied. The resulting changes in focus characteristics occur at a rate which can be described by an exponential curve. Typically a laser output coupler will have a time constant on the order of 6 seconds after turn-on before sixty-three percent of the full thermal effect is realized. In FIG. 6 exponential curves $P_1$, $P_2$ and $P_3$ graph the rate of change of beam characteristics based on different average power levels applied to an output coupler. $P_1$ is the lowest power level and $P_3$ is the highest.

Figure 7:
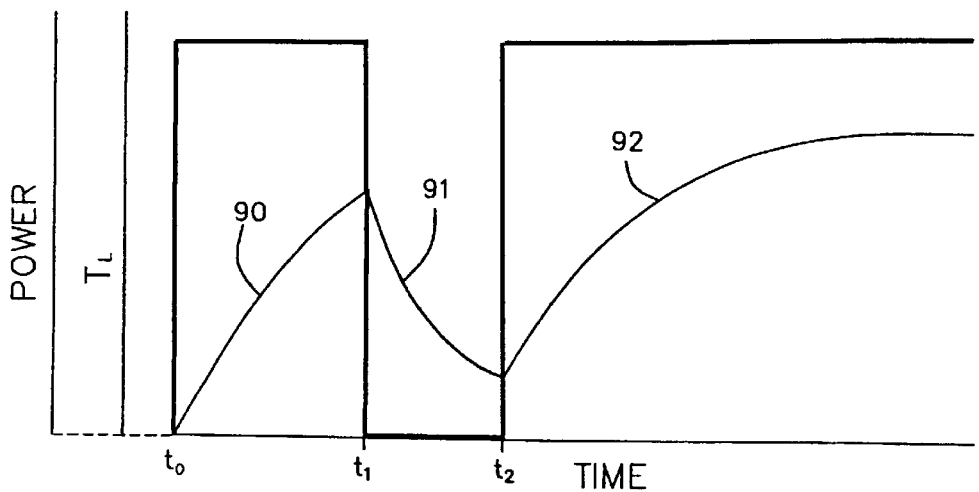
FIG. 7 is a diagram illustrating the thermal loading of a lens, showing the signals applied to the laser and relative distortion in the lens.

Also it must be considered that the laser will not be continuously on, but will be switched on and off for fairly brief intervals. When the laser is switched off, the lens will cool at a rate also describable by an exponential curve. In addition, the laser may be operated at various power levels which will alter the steady state level of stored energy in the optic. In summary, the amount of thermal distortion of an output coupler or other optic is a variable, dependent upon the power on the optic with the rate of change describable by an exponential function having a time constant matching that of the optic system and dependent on the time which has lapsed after the beam is turned on or off. FIG. 7 shows a power versus time plot for a typical optic, such as the output coupler of a high power laser. Curve segment 90 extending from $t_0$ to $t_1$ shows the rate of thermal buildup in the optic after power is initially applied. At time $t_1$ the laser is switched off. Curve 91 shows the exponential cooling rate of the optic until it reaches $t_2$ at which point the laser is turned on again. Curve 92 shows the rate of thermal buildup from $t_2$. The curve of FIG. 7 can be considered an integrated power time representation of the amount of thermal energy stored in an optic. Such information is used in the practice of the present invention to determine compensation values to correct for thermally caused changes in beam characteristics.

In order to compensate for changes in the optical system, a signal is utilized indicative of the integrated energy level stored in an output coupler, operating between its two steady state energy points of off and fully saturated or any power level selected in between these two extremes. In real time, the amount of thermal energy stored in the optic is tracked and determined. That information is used to determine a correction value. The correction value is introduced in real time to a drive system to adjust a collimator optic to correct focal characteristics of the beam. In systems, such as the exemplary one, in which the beam path length changes, the amount of thermal energy stored in the output coupler and the length of the beam path are used in combination and in real time to determine the compensation value. In machine tools having a fixed beam path length only the thermal energy stored in the output coupler would be used to determine the compensation value.

Figure 8:
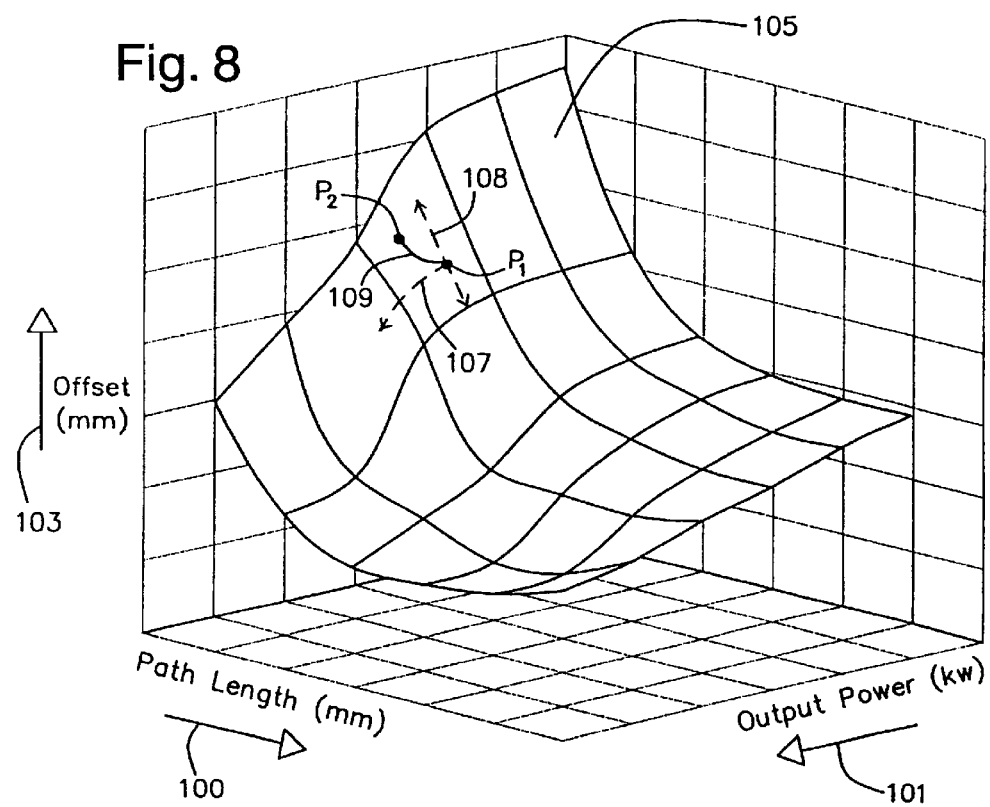
FIG. 8 is a diagram illustrating an example of a three dimensional correction curve as used in the practice of the present invention.

In a currently preferred practice of the invention, a reflective collimator is interposed between the laser and the focusing optic, and has an adjustment mechanism operated to compensate for both thermal lensing changes and path length changes. The nature of the changes can be conceptualized as introducing a correction based on a three-dimensional curve, a form of which is illustrated in FIG. 8. Turning to FIG. 8, a three axis grid is shown in which a first axis 100 defines path length changes from a fixed reference, such as zero, at the ordinate to the maximum path length change. Thus, the cutting head in the shortest path length position, corresponds to a point on the axis 100 at the ordinate, and movement of the cutting head in directions which increase the path length move the point in the direction of the arrow 100.

Integrated output power in units such as kilowatts, is plotted along the axis 101. The minimum power point is at or near the ordinate, and increasing power levels are displaced from the ordinate in the direction defined by arrow 101. The output power plotted along this axis is the integrated output power at any given point in time, such as is shown in FIG. 7.

The third axis in the three-dimensional plot is the offset for the collimator. The offset in one example has a zero position at the ordinate and increasing positive deviation indicated by the arrow 103. The scale can also be arranged with zero offset at an intermediate position providing both positive and negative offsets on respective sides of the zero point.

FIG. 8 has a three-dimensional surface 105 plotted thereon which is the relationship between output power, path length, and collimator offset for a particular machine tool. Thus, it is known that for any given amount of integrated energy in the optic and for any given path length in the machine, the collimator will need to be adjusted by the appropriate offset defined by the surface 105 in order to maintain the beam waist (FIGS. 4a and 4b) at the appropriate size and position, in order to keep the size of the laser beam incident on the focusing optic at the desired diameter. As will be clear from FIG. 7 the integrated output power in the lens will change over time based on power level and whether the laser is on or off, and thus the input along the axis 101 will be continuously changing as the laser beam is triggered. Similarly, the path length will be changing as the cutting head is traversed to cut a particular part, causing the path length along the axis 100 to be continuously changing. As a result, the three-dimensional relationship identified by the surface 105 will cause the resulting offset to be continuously changing, and the offset will be coupled to a servo or other prime mover in the collimator to continuously and in real time adjust the collimator to maintain the beam size on the focusing optic at the desired size.

Consider for example that at a given instant in time the operating conditions for the system are defined by a point $P_1$ on the surface 105. That demands a given offset as determined by the three-dimensional relationship. As the laser remains on, however, thermal loading will increase and the operating point will begin to move in the direction indicated by the arrow 107. Similarly, as the cutting head is traversed the operating point $P_1$ will move in one direction or the other as indicated by the double headed arrow 108. The result may, for example, be a movement of the point from $P_1$ to $P_2$ along the path 109. That requires a continuous change in offset which is communicated to the collimator in order to maintain the desired beam size.

To correct for thermal lensing of the focusing optic integrated power-time information for that optic is utilized to determine a compensation value which is introduced in real time to the lens driving system to correct and thereby maintain the intended position of the focal spot. In the illustrated embodiment the correction signal is added as an offset to the signal which drives the servo which controls the position of lens carrier 35 in cutting head 23. In other systems, such as those using adaptive optics, the shift signal can be used as an offset in the controller for the adaptive optic. In some cases, the shift signal can also be used as an offset for the Z-axis control of the cutting head.

When compensations are made for both the output coupler and the focal optic, the position of the focal spot relative to the workpiece is rendered substantially consistent regardless of the position of the cutting head, regardless of the operating power level, regardless of the steady state conditions of beam full on and off, and regardless of the intermediate conditions between those steady states.

Figure 9:
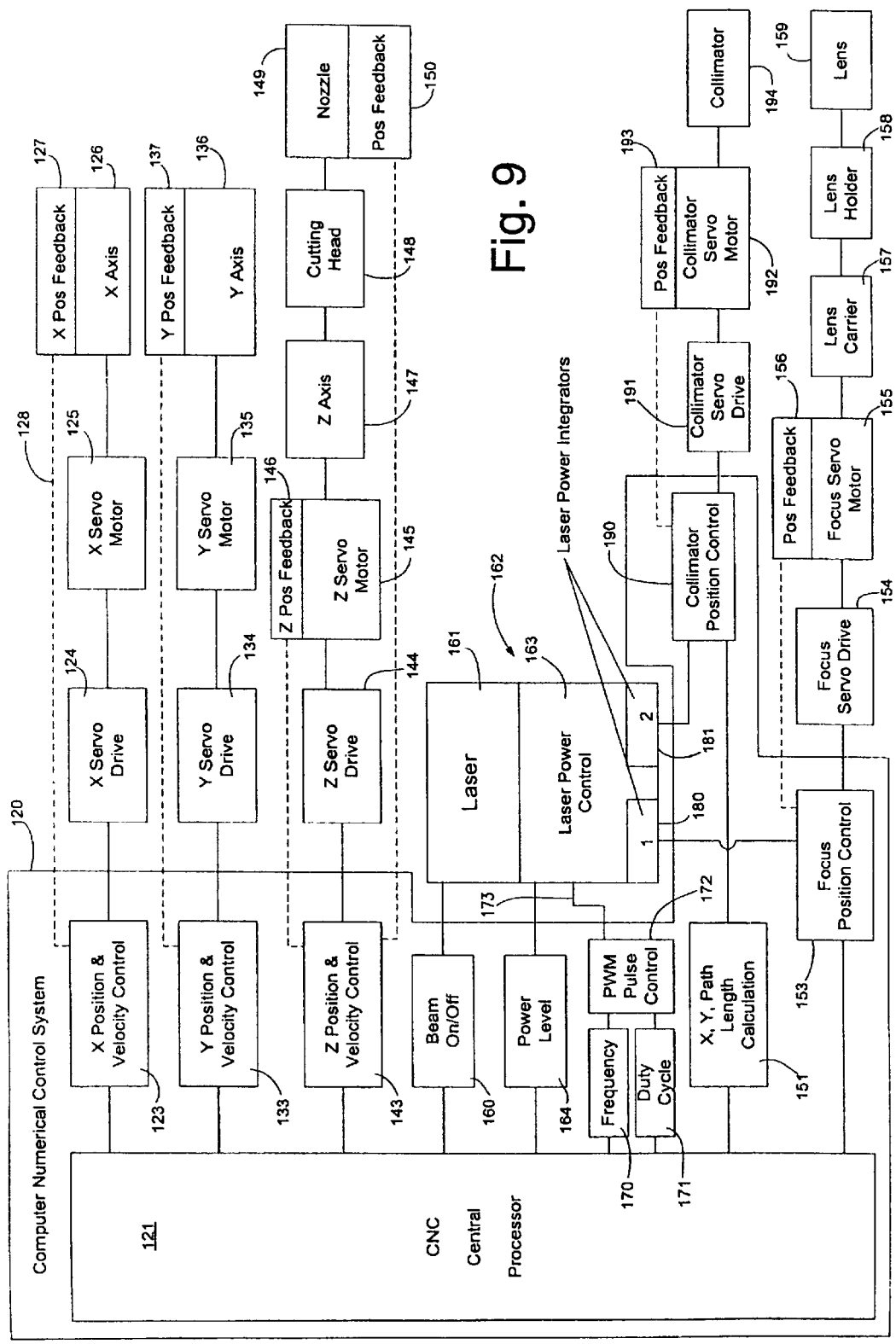
FIG. 9 is a block diagram illustrating a control system exemplifying the present invention.

Turning now to FIG. 9, there is shown a block diagram for a control system adapted to make the aforementioned corrections in accordance with the present invention. A computer numerical control system 120 is represented by the large block, with a number of functional blocks within it. The CNC central processor 121 is separately illustrated, although it will be appreciated by those skilled in the art that many of the functions separately illustrated within the block 120 are performed in whole or in part by the CNC central processor. They are shown separate in FIG. 9 as an aid in understanding the present invention.

The illustrated numerical control system is a four axis device, with conventional X, Y and Z axes and a fourth axis parallel to the Z-axis devoted to the position of the lens carrier. The invention can be applied with more or fewer axes. The CNC system 120 includes a position and velocity control module for each of the X, Y and Z axes. Thus, an X position and velocity control module 123 responds to signals from the central processor 121 to control an X-axis servo drive 124 which in turn controls the X-axis servo motor 125. The position of the bridge along the X-axis is represented by the box 126, and it is seen that a feedback position element 127 has an output 128 connected as a feedback input to the X position and velocity control module 123. Thus, the CNC is capable of driving the bridge along the X-axis to any coordinate and at any selected velocity in a conventional fashion.

A Y position and velocity control module 133 has associated elements including a Y-axis servo drive 134 and a Y-axis servo motor 135 which control the position of the cutting head along the Y-axis 136. Position feedback element 137 provides feedback to the Y position and velocity control module 133. The Z position and velocity control module 143 is similar to the X and Y modules in the present embodiment, in that is acts through a Z-axis servo drive 144 upon a Z-axis servo motor 145. In this case, however, the servo motor 145 has feedback element 146 associated directly with the motor, and that position feedback is coupled back to the feedback input of the Z position and velocity control module 143. The Z-axis position is represented by the block 147, and the block 148 indicates that it is the cutting head 148 which is positioned along the Z-axis, and more particularly the nozzle which is represented by the block 149. Additional position feedback 150 is provided from the nozzle and coupled back to the Z position and velocity control module 143. The cutting head can have, for example, position feedback dependent on the proximity to the workpiece which obviously can vary in thickness. Thus the position feedback element 146 can respond in absolute coordinates to the position of the drive, whereas the feedback position element 150 may respond in terms of the position of the nozzle 149 with respect to the workpiece.

In practice, whenever a cut is to be made, the CNC central processor 121 operates through the modules 123, 133, and 143 to position the cutting head with the nozzle above a selected point on the workpiece. Piercing is accomplished and then the nozzle is traversed across the workpiece in directions coordinated to the shape and size of the part to be cut, with the laser beam switched on and off at appropriate power levels during the traverse of the cutting head to cut the appropriate part.

In practicing the invention the numerical control system 120 includes a module 151 which operates in conjunction with the modules 123 and 133 to determine an X, Y path length calculation for purposes of compensating for the beam path length. Thus, the modules 123 and 133 have precise information on the position of the cutting head with respect to the workpiece, and thus have the information necessary to calculate the path length or deviations in the path length from a set or home position. The module 151 performs that computation to produce the path length correction which is one of the inputs to the three-dimensional correction of FIG. 8.

The CNC central processor 121 also has the capability of positioning the lens holder along the Z-axis. This is, in effect, a fourth numerically controlled axis, sometimes called the U-axis. A focus position control module 153 similar to the modules 123, 133, and 143, responds to commands from the central processor 121 to control the position of the lens carrier within the cutting head. An output signal from the module 153 is coupled to a focus servo drive 154 and which controls a focus servo motor 155. The servo motor 155 has a feedback module 156 associated therewith which couples a position feedback signal to the module 153. The servo motor 155 controls the vertical position of the lens carrier represented by the block 157 which carries the lens holder represented by the block 158 which in turn carries the lens represented by the block 159.

Thus, as so far described, the focus position control operates in a similar fashion to the Z position control module 143 to control the position of the lens within the cutting head. Operation of the focus position control 153 with the Z position maintained constant will tend to shift the focus point either toward or away the workpiece depending upon the direction of controlled movement.

The CNC central processor 121 also controls certain aspects of the laser operation, including laser beam on/laser beam off, the power level at which the laser is commanded to operate, and in cases of pulse width modulated control of the laser, the frequency and duty cycle of the pulse width modulated output. Thus, the CNC central processor 121 is coupled to a beam on/off control module 160 which in turn is coupled to a laser control processor 161 in the laser control module generally indicated at 162. The laser processor 161 accepts signals from a numerical controller to take such actions as turning the beam on and off. The module 160 is adapted to send those signals to the computerized control 161 which then responds by controlling the on or off state of the beam. The control module 162 also includes a laser power control unit 163. The CNC processor 121 has associated therewith a power level control module 164 which is an interface to the laser power control processor 163. Thus, if a particular cut is to be made with the laser beam set at 3000 watts, for example, the processor 121 will output data to the power level control module 164 indicating that the laser power control 163 is to be instructed to operate the laser at the 3000 watt level. The module 164 thereupon sends a signal to the laser power control unit 163 which causes the processor within the module 163 to operate the laser with a 3 kW output.

For operating the laser beam under pulse width modulated control, the CNC processor 121 has interface elements including a frequency control module 170, a duty cycle control module 171, and a pulse width modulated pulse control 172 to set the frequency of the on and off periods and the duty cycle within that frequency at which the laser beam is to be operated. The frequency is set by way of interface module 170 and the duty cycle by way of interface module 171. Those signals are combined in the pulse width modulated pulse control interface element 172 to produce a duty cycle output signal on a line 173 which is coupled to the laser power control computer 163 for pulsing the laser on and off for a given duty cycle at a given frequency as demanded by the CNC central processor 121.

In practicing the invention, a pair of laser power integrators 180, 181 are provided for monitoring the energy stored within two different optical elements in the system. In the typical application, the modules 180 and 181 will have different time constants and different energy levels, and will be associated with particular optical elements in the system to monitor the stored energy condition of the those elements. Recalling FIG. 7, it will be seen that the integrators 180 and 181 are capable of monitoring the position along the curve relating time to stored energy. Thus, an output signal from the integrator will continuously indicate the energy stored within the associated optical element in real time.

In the illustrated embodiment, the integrator 181 is associated with the output coupler of the laser. It may have, for example, a time constant in the range of six to ten seconds and be capable of indicating the stored energy in the optic associated with the laser output power level. It is recalled that the curve of FIG. 7 is intended to illustrate the energy stored in the laser output coupler, and thus the integrator 181 monitors the on and off intervals and the power levels of the laser during normal and PWM operation. The integrator 181 has stored therein a curve which represents the energy storage and energy released values and time constants for the associated optical elements and thereupon integrates positively to increase the stored energy level whenever the laser is on or the power level is increased, (such as illustrated at 90 and 92 of FIG. 7), and integrates negatively to decrease the stored energy level, (such as illustrated at 91 of FIG. 7), whenever the laser is off or the power level is decreased. Thus, curves such as illustrated in FIG. 7 will be generated over time by the integrator 181 and will serve as a measure of the energy stored within the laser output coupler.

The integrator 180 is similar in construction but will typically have a different time constant associated therewith. In the preferred embodiment the integrator 180 is associated with the focus optic. As such it may have a time constant which is much nearer twenty seconds than the six seconds of the laser output coupler. However, it will have an exponential build-up and exponential decay, similar to the output coupler. Since focusing optics are typically indirectly cooled, the cooling curve may be somewhat shallower than the warming curve. However, those conditions will be determined by experiment for a particular set of hardware, to produce a particular set of parameters which generate a curve such as that illustrated in FIG. 7, but with values and constants defined by the physical response of the particular optic to incident laser energy at given power levels. It is also noted that typically a laser will have a shutter box which will be closed at times with the laser beam on. In those conditions, the output coupler will have energy incident thereon, but the focus optic will not, so the integrators will be operating under different conditions.

In practicing the preferred embodiment of the present invention, the path length determination made by module 151 is combined with the integrated energy information collected by integrator 181 to determine from a characteristic such as the aforementioned three-dimensional relationship, a correction to be introduced into the laser beam by way of position control of the collimator 22. Thus, a collimator position control module 190 has a first input coupled to the energy integrator 181, and a second input coupled to the X, Y path length calculation module 151. The collimator position and control module 190 has data stored therein corresponding to the three-dimensional relationship of FIG. 8, and produces an output representing a correction signal to be sent to the collimator. In the present embodiment that output is produced as an offset signal on a signal line coupled to the collimator servo drive 191. The drive 191 operates the collimator servo motor 192 which in turn positions the collimator 194 to adjust the divergence of the laser beam so as to maintain a beam size of the desired dimension at the focus optic. The collimator servo motor 192 has a position feedback element 193 associated therewith which returns a feedback signal to the collimator position control 190.

The focus optic integrator 180 has an output coupled as an input to the focus position control 153. It is recalled that the position control 153 operates on a primary signal from the CNC central processor 121 to control the position of the lens 159. An offset signal is provided by the integrator 180 which serves to modify the output signal of the focus position control in accordance with the energy stored in the focus optic. Thus, the output signal from the focus position control 153 is modified to take into account the distortion of the focus optic caused by a laser beam of a particular power incident thereon during its actual on and off times. That offset adjusts the output signal of the focus position control so that the actual position of the lens 159 is adjusted in accordance not only with the machine position commands of the CNC central processor 121, but also to correct for distortion in the optic created by the laser beam passing through the focus optic at particular power levels for particular lengths of time.

In summary, the control system illustrated in FIG. 9 operates in a conventional fashion to traverse the cutting head over the workpiece and to control the power level and on and off condition of the laser beam to cut parts from the workpiece. In addition, the laser power control 163 has a pair of integrators associated therewith to integrate the stored energy in the two primary devices which will distort as a result of high power laser energy being incident thereon. In connection with the output coupler, the energy is integrated according to the power level set for the laser and the actual on and off intervals for the laser, and that signal is coupled along with a beam path length correction to operate through a three-dimensional correction curve to adjust the collimator so as to maintain a constant beam size at the focus optic for all positions of the cutting head and all possible states of distortion of the output coupler. Thus, as the CNC controller 121 operates the cutting head to move it across the workpiece to cut particular shapes, the path length calculation is continuously made by the module 151 and the collimator position control is continuously adjusted to maintain the desired spot size at the focus optic, all in real time. Similarly, as the laser is on for longer periods of time and tends to increasingly distort the output coupler until equilibrium is reached, a signal is produced by the integrator 181 to also adjust the collimator to take into account the distortion of the output coupler occasioned during the cut.

In addition, also in real time, a second integrator with a separate time constant maintains the integrated energy level of the focus optic and couples that signal through a focus position controller 153 to separately adjust the position of the lens with respect to the workpiece. Thus, for example, the first correction control system maintains a constant spot size or beam diameter on the focus optic and the second control system, which takes into account distortion of the focus optic, adjusts the position of that optic to maintain the focused spot size and position where the CNC central processor 121 commands.

Having described in detail the operational elements of the laser system, with particular emphasis on the beam delivery system and its control, attention will now be directed to the aspects of the machine base which are particularly adapted to the high power laser plate cutting machine. As noted above, there is significant possibility of damaging the machine base with a high power laser, particularly using long focal length lenses, when the laser beam is operated at power but for one reason or another, no workpiece is interposed to receive the beam. In that case, the beam incident on the bed is of high energy density and is potentially destructive. The slag collection bed in the illustrated embodiment is adapted to absorb the energy in such a situation without permanent damage. In some circumstances, or after time, the bed may become sufficiently distorted to require repair or replacement. However, the machine is not "damaged" in the sense that it is rendered inoperative for long periods of time. This is due in part to the fact that the bed is self-healing to a certain extent and replacement intervals will be extended. This is also due to the fact that the bed elements which might absorb significant heat from the laser, are readily replaceable so that machine downtime is minimized.

Turning briefly to FIG. 12, the reason for protecting the machine bed will be explained. FIG. 12 diagrammatically shows a laser beam 60 incident on focusing optic 36b in the cutting head which focuses the beam to a focal spot 244. The beam then diverges at about the same angle as the convergence angle. Thus, if a 5,000 watt laser beam 35 mm in diameter were incident on a lens having a 12.5 inch focal length, if no workpiece were interposed, so that there was no energy absorber in the beam path, at a position 12.5 inches below the focal point the remnant beam 246 would again be at approximately 35 mm diameter and would have a power of about the same level (e.g. 5,000 watts) as the incident beam. At 25 inches from the focal point the remnant beam would have a roughly 70 mm diameter with significant and potentially dangerous energy density. In a practical laser cutting machine, particularly one configured for high power, it is not convenient or practical to provide a sufficient air space between the nozzle and the slag collection bed to adequately protect the machine base. If the machine base protection problem were ignored altogether, there is a significant probability that at some time during the life of the machine the laser energy projected onto the base, including beams partly absorbed by the workpiece, or a direct beam when no workpiece is in place, could cause a failure in the base. When used herein, the term "remnant laser beam", unless context indicates otherwise, is intended to encompass both beams partly absorbed by the workpiece, and those which project past the workpiece, and the energy contained in such beams.

In accordance with the invention, means are associated directly with the base for performing the functions of insulating the machine base from the possibly high temperatures generated in the slag bed and the slag during the cutting operation, for collecting the slag in a way which allows for ready removal, and for providing a readily replaceable shield for the base which can be damaged during extended machine usage and then replaced. The shield member is strong and durable, is insulated from the base itself, is relatively inexpensive, and can be replaced at relatively low cost, particularly as compared to repairing structural damage in the base.

Referring briefly to FIG. 3 for orientation, the proximity of the slag collection bed 200 to the workpiece 32 and cutting nozzle 37 will be appreciated. The workpiece 32 is carried on a pallet 31 which, in the preferred embodiment, is made up of a plurality of support plates, turned on edge, to allow scrap and slag formed during cutting to fall through the supporting bars to lodge on the slag bed 200. The bed

200 is intermediate a pair of machine legs 201, 202 which carry the machine bridge 24 for translation along ways generally indicated at 203, 204.

Figure 14:
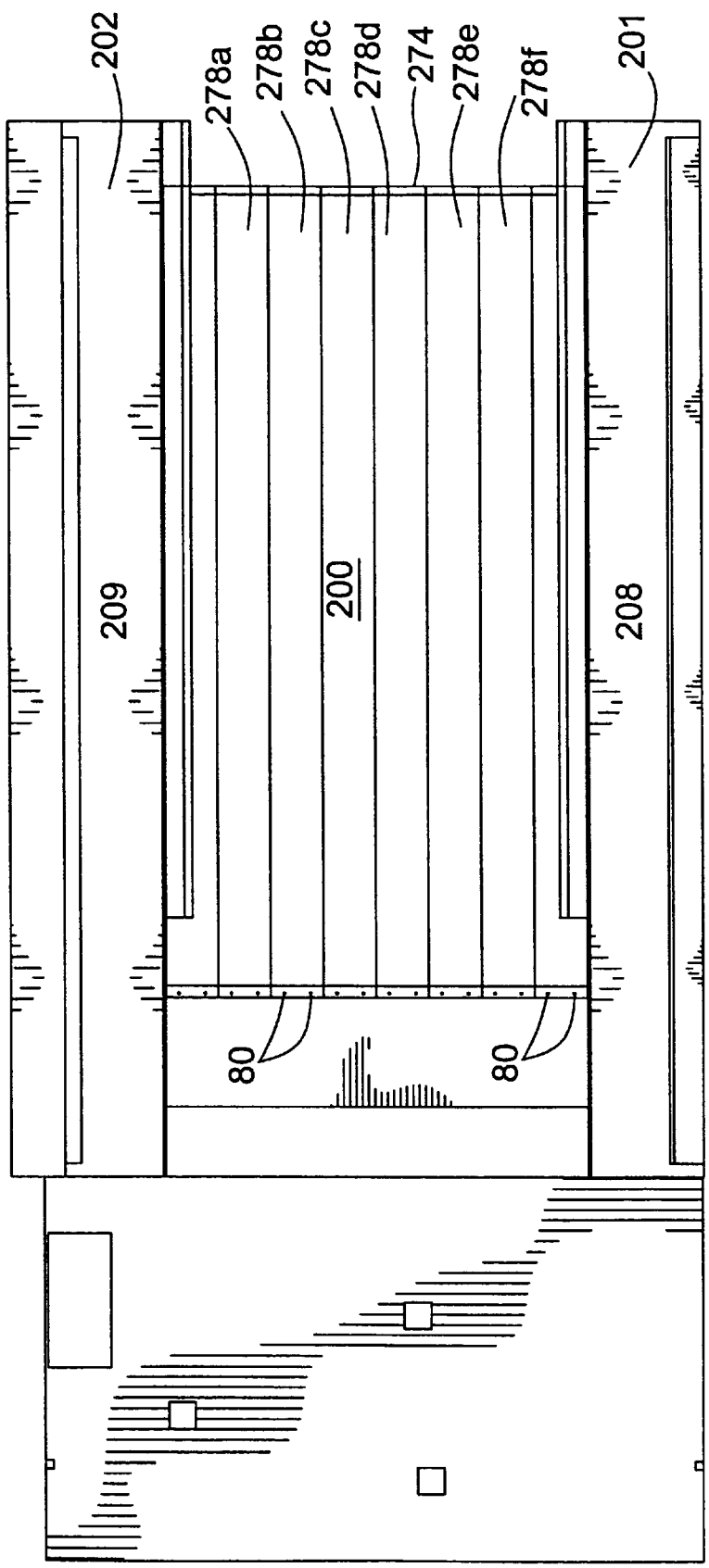
FIG. 14 is a plan view showing the slag collection bed with laser shielding plates.

The configuration of the machine base is shown generally in FIG. 13, as comprising a plurality of interlinked plates which form the supporting structure for the raised legs 201, 202 and the slag collection bed 200. The structure of the bed will not be described in detail herein, but is described and claimed in parent application Ser. No. 09/302,278, filed Apr. 30, 1999, the disclosure of which is incorporated herein by reference. As shown in FIG. 14 the supporting structure is covered by appropriate members. For example, the legs 201, 202 have upper surfaces 208, 209 respectively which carry the ways (not shown) which support and guide the machine bridge.

Of particular note in FIG. 14 are the plates 278a–278f which comprise the slag collection bed 200. It is the structure and support for the slag collection bed to which attention will now be directed.

With reference primarily to FIGS. 10 and 11, the preferred form of insulated machine base will be described. One of the horizontal plates 260a which make up the machine base 30 terminates in an extended lip 270 which extends across the entire width of the machine. The lip 270 is positioned out of the range traversed by the cutting head, so that it will not be exposed directly to the laser beam. A supporting plate 271 is provided at the far longitudinal end of the machine (see FIGS. 13 and 13a). The plate 271 can, as suggested in FIG. 13a, be in the form a bar having a length equal to the width of the bed, and placed on edge as illustrated to close the bottom of the pocket now to be described. The plates are positioned to provide support surfaces at a known distance above the top surface of a horizontal plate 260 which is a part of the horizontal bed structure. The known distance provides a chamber to receive and hold insulation material as shown in FIGS. 10, 11 and 13a. Thus, sheet like insulation material 273 is disposed in the chamber formed between the supports 270, 271 so that it forms a top surface which is co-planar with the top surface of supports 270, 271. Overlying the insulation material 273 is a metal plate 274, preferably steel, which has an outer surface 275 serving as the collection surface for the slag and scrap, and a laser shield for the base.

The insulation 273, in addition to performing its insulation function, provides a flat supporting surface for the protective shield 274. There may be times in machine operation where the shield will be heated to the point of sagging or even melting. Providing a firm planar underlying support supports the shield and allows heated or molten metal of the shield 274 to resolidify while still retaining its substantially planar configuration.

For insulation, it is currently preferred to use ordinary gypsum board, preferably two sheets 273a, 273b, totaling about 1.25 inches in thickness. The gypsum board 273a, 273b is inexpensive, and can be readily obtained and easily cut to size. It is easy to dispose of when it needs to be changed. It provides a flat planar surface for supporting the protective plate 274 and can withstand the associated temperatures if the plate melts, while continuing to support the plate during resolidification. It is preferred to use two sheets of gypsum board to provide a further barrier to heat transfer.

The protective plate 274 is preferably comprised of a plurality of individual side-by-side strips 278a, 278b, etc. The strips span from the left hand supporting lip 270 to the right hand supporting lip 271 and are supported by the gypsum board between the lips. In this illustrated embodiment, each strip has a pair of apertures 280 through which fasteners 281, such as conventional machine bolts, project to fit into threaded holes 282 in the forward lip 270 to thereby fix the strip in place. Attachment need not be made at the other end 271, in order to allow freedom for the strip to expand and contract. Other attachment or drop-in arrangements can be used. If one or more strips are damaged during the course of long use it is a relatively simple matter to remove the fasteners 281, remove one or more damaged strips, and replace them with equivalent strips, whereupon the machine is again ready for operation. It is not necessary to replace the entire bed at once, but only a single strip whenever it is required. Similarly, if the insulation material is damaged at some point, a number of strips can be removed for replacing entire sheets of gypsum board or sections thereof can be cut out and replaced with sections of equal size. While it is preferred to use a plurality of individually removable strips as illustrated, it is emphasized that the important feature of the slag bed is the protection afforded the machine base coupled with ready replaceability, a feature which can be attained in some configurations with a single piece replaceable bed.

With respect to the materials of construction of the insulated bed, the aforementioned double sheet gypsum is the currently preferred embodiment, but it will be clear to those skilled in the art, that other forms of insulation can be used. Gypsum board is, however, useful in the present application because it is low in cost, rugged, and has a very low thermal conductivity factor, approximately 0.062. Any equivalent material should have a conductivity factor at about the same or lower value, preferably 0.1 or lower. Tests utilizing gypsum board have determined that even though the laser can produce temperatures in excess of 2500° F. at the surface 275 of the shield 274, the temperature between the gypsum board layers 273a, 273b can be maintained at less than 600° F., and that the temperature at the bottom surface of the bottom layer 273b can be maintained at less than 150° F., well below the point at which the machine base will experience any thermal damage.

It is also noted above that strips 274 are preferably steel. This is due in part to the fact that steel has been found adequate to resist the detrimental effects of slag for a time, and is relatively inexpensive and available. Aluminum, while a good thermal conductor, is not sufficiently hard to withstand the slag removal process. Other alloys might be used and be effective, but typically at a higher cost than steel.

It will now be appreciated that what has been provided is a laser-equipped machine tool configured to cut heavy plate at production speeds. A high power laser, preferably 3 to 4 kilowatts or more, and most preferably at least 6 kilowatts, provides the cutting power. A beam delivery system couples the beam from the laser to the focal optic in the cutting head. The beam delivery system has an adjustment mechanism to compensate for distortion in the output coupler caused by the high power laser beam. Preferably the mechanism is automatically adjusted by the CNC so that the beam size is precisely maintained in the presence of transient distortions in the optics. The cutting head which delivers the cutting beam and assist gas stream to the workpiece is adjustable by the CNC along X, Y and Z axes, so as to control machine motion to make the programmed cuts. The cutting head also has the ability to adjust the position of the focal spot with respect to the plate, a feature which is significant in the cutting of heavy plate. Finally, the machine base is configured to withstand the remnant laser beam which occasionally projects past the workpiece onto the machine bed. In the event of machine base damage, the machine bed is readily repairable without excessive machine down time.

These features which combine to provide the ability to cut heavy plate at production speeds can also afford significant utility when the machine is used for thinner sheet materials. The cutting head is preferably provided with the ability to exchange optics such that a relatively long focal length lens can be used with thicker materials, but shorter focal length lens can be substituted for cutting thinner materials. When cutting thinner material, the cutting speed significantly increases. The flying optic configuration and a comparatively light weight bridge structure allow high rates of acceleration and deceleration, high cutting speeds and rapid traverse speeds, while the automatic beam adjustment mechanism compensates for beam path variations. The result is a machine configured to cut heavy plate, but which can, if desired, also operate on lighter sheet metal at commercial production rates.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A heavy-duty laser plate cutting machine comprising in combination:
   a laser source producing a laser beam having an output power of at least 3 kilowatts and having an output coupler;
   a cutting head carrying a cutting nozzle and a focusing optic which focuses the laser beam to a focal spot and directs the focal spot toward a workpiece for cutting the workpiece;
   a drive system for controlling relative motion between the cutting head and the workpiece;
   an automatic beam control system interposed between the laser source and the focusing optic for controlling the size of the laser beam on the focal optic;
   the automatic beam control system interposing a first correction for the length of the beam path between the laser resonator output coupler and the focusing optic in the cutting head, and a second correction for thermal lensing of the laser resonator output coupler which integrates the on and off intervals of the laser beam with a thermal time constant of the output coupler;
   the cutting head having an adjustment for positioning the focusing optic to position the laser beam focal spot relative to the workpiece during cutting; and
   a slag collection bed underlying the workpiece and capable of absorbing the energy of the laser beam without permanent damage to the machine said slag collection bed comprising a hard, smooth, metal surface underlaid by a heat resistant insulating and supporting means.

2. The combination of claim 1 wherein the automatic beam control system provides an output signal to a computer numerical control controlling a reflective collimator.

3. The combination of claim 2 wherein the computer numerical control is configured to drive the reflective collimator to compensate for changes in length of the beam path and for the thermal lensing of the laser source output coupler.

4. The combination of claim 3 wherein the computer numerical control is configured to adjust the collimator to maintain the size of the laser beam impinging on the cutting head focal optic constant for cutting a workpiece.

5. A heavy-duty laser plate cutting machine comprising in combination:
   a laser source producing a laser beam having an output power of at least 3 kilowatts;
   a cutting head carrying a focusing optic which focuses the laser beam to a focal spot and directs the focal spot toward a workpiece for cutting the workpiece;
   a drive system for controlling relative motion between the cutting head and the workpiece;
   an automatic beam control system interposed between the laser source and the focusing optic for assisting the cutting head to focus the laser beam;
   the cutting head having an adjustment for positioning the focusing optic to position the laser beam focal spot relative to the workpiece during cutting;
   wherein the laser source is stationary, a bridge traversable along a first axis carries the cutting head which is traversable along an orthogonal axis, and the automatic beam control system is operated by the computer numerical control configured to compensate for path length changes as the cutting head and bridge traverse to controllably position the cutting head over the workpiece; and
   a slag collection bed underlying the workpiece and capable of absorbing the energy of the laser beam without permanent damages to the machine, the slag collection bed comprising a hard, smooth, metal surface underlying the entire workpiece so as to collect slag as the bridge and cutting head traverse the workpiece during a cut.

6. The combination of claim 5 wherein the cutting head has a computer numerically controlled adjustable axis normal to the workpiece to controllably position the cutting head cutting nozzle with respect to the workpiece.

7. The combination of claim 6 further comprising a lens carrier in the cutting head for carrying the focusing optic and having a drive for adjustment of the lens carrier within the cutting head normal to the workpiece, the computer numerical control being connected to the lens carrier drive for independently altering the position of the focus spot with respect to the workpiece without adjusting the position of the cutting head.

8. The combination of claim 7 wherein the computer numerical control is configured to adjust the lens carrier to compensate for thermal lensing of the focusing optic by the integration the laser power level output by the laser source and the on and off intervals of the laser beam with a thermal time constant of the focal optic.

9. The combination of claim 1 wherein the focusing optic in the cutting head is removable and replaceable, the cutting head having a plurality of slots for receiving interchangeable focusing optics and positioning each of said interchangeable focusing optics within the cutting head at focal lengths corresponding to the respective interchangeable focusing optics.

10. The combination of claim 7 wherein the focusing optic in the cutting head is removable and replaceable, the cutting head having a plurality of slots for receiving interchangeable focusing optics and positioning each of said interchangeable focusing optics within the cutting head at focal lengths corresponding to the respective interchangeable focusing optics.

11. A heavy-duty computer controlled plate cutting machine comprising in combination;
   a stationary laser source producing a laser beam having an output power of at least 3 kilowatts;
   a workpiece supporting means;
   a bridge traversable along a first axis carrying a cutting head which is traversable along an orthogonal axis, and a drive system for controlling the relative motion between the cutting head and the workpiece;
   said cutting head having a nozzle, a lens carrier, a focal lens, controllably positioned in an axis normal to the workpiece to position the nozzle with respect to the workpiece, and a drive for adjusting the position of the lens carrier within the cutting head independently altering the position of the laser beam focus spot with respect to the workpiece without adjusting the position of the cutting head in the axis normal to the workpiece;
   an automatic beam control system interposed between the laser source and the focal lens for controlling the diameter of the laser beam on the focal lens;
   the automatic beam control system interposing a first correction for the length of the beam path between the laser resonator output coupler and the focusing optic in the cutting head, and a second correction for thermal lensing of the laser resonator output coupler which integrates the on and off intervals of the laser beam with a thermal time constant of the output coupler;
   a thermal lensing control for the focal lens comprising an integration means integrating the laser source power level output and the on and off intervals of the laser beam with a thermal time constant of the focal lens; and
   a slag collection bed underlying the workpiece and capable of absorbing the energy of the laser beam without permanent damage to the machine, said slag collection bed comprising a hard, smooth, metal surface underlaid by a heat resistant insulating and supporting means.

12. The combination of claim 11 wherein the compensation means provides an output signal for controlling a reflective collimator and the control means for compensation for thermal lensing of the focal lens provides an output signal for adjusting the position of the focal lens normal to the workpiece.

13. The combination of claim 12 wherein the collimator is adjusted to maintain the diameter of the laser beam impinging on the focal optic constant for cutting a workpiece.

14. The combination of claim 12 wherein the collimator is adjusted to maintain the diameter of the laser beam impinging on the focal optic constant for cutting a workpiece and the position of the focal lens normal to the workpiece is adjusted to maintain the position of the focal point relative to the workpiece constant for cutting a workpiece.

15. The combination of claim 11 wherein the heat resistant and supporting means is comprised of a continuous support for the overlying metal surface such that should the overlying metal surface be briefly melted by the laser beam the metal surface will not sag nor create a hole but will resolidify, upon removal of the laser energy, self healing to a functional state.

16. The combination of claim 15 wherein the heat resistant and supporting comprises an insulation material having a low coefficient of thermal conductivity for protecting the underlying supporting surface.

17. The combination of claim 15 wherein the heat resistant and supporting means is comprised of gypsum board.

18. The combination of claim 11 wherein the upper surface of the hard, smooth surface, metal surface is exposed to remnant laser energy and to receive slag and scrap from the cutting process and is comprised of a plurality of strips of carbon steel that are laid perpendicular to an open end of the machine such that all seams between strips are perpendicular to the open end of the machine and wherein the heat resistant and supporting means comprise a plurality of sheets of gypsum board continuously supporting the strips of carbon steel such that should a portion of said carbon steel strip be briefly melted by the remnant laser energy it will not sag nor create a hole but will resolidify, upon removal of the laser energy, self healing to a functional state.

19. The combination of claim 11 wherein the plate cutting machine further comprises a machine base underlying the workpiece supporting means, said machine base supporting and protected by the slag collection bed.

20. The combination of claim 11 in which the hard, smooth metal surface is comprised of carbon steel.

21. The combination of claim 11 in which the hard, smooth metal surface is comprised of multiple strips of carbon steel that are individually replaceable in the event they are damaged by remnant laser energy and that are laid perpendicular to the open end of the machine such that all seams between strips are perpendicular to the open end of the machine.

22. The combination of claim 15 wherein the laser source produces a laser beam having an output power of at least 4 kilowatts.

23. The combination of claim 11 in which the automatic beam control system is operated by the computer numerical control and is configured to compensate for path length changes between the laser source output coupler and the cutting head focal lens and for thermal lensing of the laser source output coupler and separately for thermal lensing of the focal lens as the cutting head and bridge traverse to controllably position the cutting head over the workpiece.

24. The combination of claim 18 wherein the plurality of strips of carbon steel are mounted for ready replacement in the event they are damaged by remnant laser energy.

* * * * *